United States Patent
Crowne

(10) Patent No.: US 9,793,991 B2
(45) Date of Patent: Oct. 17, 2017

(54) OPTICALLY INTERFACED REMOTE DATA CONCENTRATOR

(71) Applicant: Simmonds Precision Products, Inc., Vergennes, VT (US)

(72) Inventor: David H. Crowne, Weybridge, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 15/070,278

(22) Filed: Mar. 15, 2016

(65) Prior Publication Data

US 2017/0272157 A1    Sep. 21, 2017

(51) Int. Cl.
*H04B 10/25* (2013.01)
*H04B 10/40* (2013.01)

(52) U.S. Cl.
CPC .......... *H04B 10/25* (2013.01); *H04B 10/40* (2013.01)

(58) Field of Classification Search
CPC combination set(s) only.
See application file for complete search history.

(56) References Cited

U.S. PATENT DOCUMENTS

| | | | |
|---|---|---|---|
| 4,820,916 A | 4/1989 | Partiquin | |
| 4,857,727 A | 8/1989 | Lenz et al. | |
| 4,963,729 A | 10/1990 | Spillman et al. | |
| 5,528,409 A * | 6/1996 | Cucci | H04B 10/807 398/113 |
| 5,814,830 A | 9/1998 | Crowne | |
| 6,744,036 B2 | 6/2004 | Kline | |
| 7,854,267 B2 | 12/2010 | Smith et al. | |
| 7,939,792 B2 | 5/2011 | Nyffenegger et al. | |
| 8,180,225 B2 | 5/2012 | Werthen et al. | |
| 8,917,996 B2 | 12/2014 | Belansky et al. | |
| 8,982,784 B2 | 3/2015 | Muller et al. | |
| 2004/0258408 A1 * | 12/2004 | Ramaswami | H04Q 11/0005 398/50 |
| 2012/0190989 A1 | 7/2012 | Kaiser et al. | |
| 2013/0003620 A1 | 1/2013 | Dame | |

FOREIGN PATENT DOCUMENTS

| | | |
|---|---|---|
| EP | 0626568 A2 | 11/1994 |
| EP | 0801854 A1 | 10/1997 |
| WO | 2015065479 A1 | 5/2015 |

OTHER PUBLICATIONS

Extended European Search Report for EP Application No. 17156462.8, dated Jul. 20, 2017, 10 pages.

* cited by examiner

*Primary Examiner* — David Payne
*Assistant Examiner* — Omar S Ismail
(74) *Attorney, Agent, or Firm* — Kinney & Lange, P. A.

(57) ABSTRACT

A remote data concentrator includes a front end interface, a plurality of back end interfaces and a control circuit. The front end interface is configured to receive optical energy as input and provide optical data as output to an optical link. The plurality of back end interfaces are configured to connect to a plurality of sensors. Each of the plurality of back end interfaces are configured to provide sensor power to the plurality of sensors and receive sensor data from the plurality of sensors. The control circuit is configured to provide power from the front end interface to the plurality of back end interfaces and to provide the sensor data from the plurality of back end interfaces to the front end interface.

13 Claims, 2 Drawing Sheets

OPTICALLY INTERFACED REMOTE DATA CONCENTRATOR

BACKGROUND

The present invention relates generally to remote sensing systems, and in particular to a system and method for optically interfacing data concentrators.

Systems are often implemented to remotely sense characteristics of an environment and transmit the sensed data back to a host. In systems that include several sensors, a remote data concentrator may be implemented to interface between the sensors and the host in order to reduce the number of connections required from the host to the remote sensors. Traditionally, data concentrators have included electrical interfaces to receive power and provide data to the host. These electrical interfaces are often connected using traditional copper wires, for example. In volatile environments such as fuel systems, for example, care must be taken to ensure the intrinsic safety of the electrical interconnections.

Additionally, electrical interfaces may generate undesirable electromagnetic interference (EMI). This EMI may facilitate detection of the remote sensing system that is generating the interference. This is undesirable in systems such as military applications, for example, in which the remote systems need to go undetected. Therefore, it is desirable to eliminate the need for electrical interconnections between a host and a remote sensing system.

SUMMARY

A remote data concentrator includes a front end interface, a plurality of back end interfaces and a control circuit. The front end interface is configured to receive optical energy as input and provide optical data as output to an optical link. The plurality of back end interfaces are configured to connect to a plurality of sensors. Each of the plurality of back end interfaces are configured to provide sensor power to the plurality of sensors and receive sensor data from the plurality of sensors. The control circuit is configured to provide power from the front end interface to the plurality of back end interfaces and to provide the sensor data from the plurality of back end interfaces to the front end interface.

A method for interfacing an optical link with one or more sensors includes conditioning power, using a remote data concentrator, obtained optically from the optical link; providing, using the remote data concentrator, the power to the one or more sensors using one or more back end interfaces; receiving, using the one or more back end interfaces, sensed data from the one or more remote sensors; and outputting the sensed data optically, using the remote data concentrator, to the optical link.

A remote sensing system includes an optical link, a plurality of remote sensors and a data concentrator. The plurality of remote sensors are configured to obtain sensed data. The data concentrator includes first and second interfaces. The first interface is configured to receive power from the optical link. The second interface is configured to provide the power to the plurality of remote sensors and receive the sensed data from the plurality of remote sensors. The first interface is further configured to provide the sensed data optically to the optical link.

DETAILED DESCRIPTION

A remote data concentrator is disclosed herein that is optically coupled between an optical link and remote sensors. The remote data concentrator receives optical energy from the optical link and provides optical data to the link. The remote data concentrator interfaces with the remote sensors to provide power derived from the optical energy to the sensors and to receive data from the sensors. The remote data concentrator may interface with the sensors optically in a similar manner to its interface with the optical link. The remote data concentrator converts and conditions the received sensor data for optical transmission on the optical link.

Figure 1:
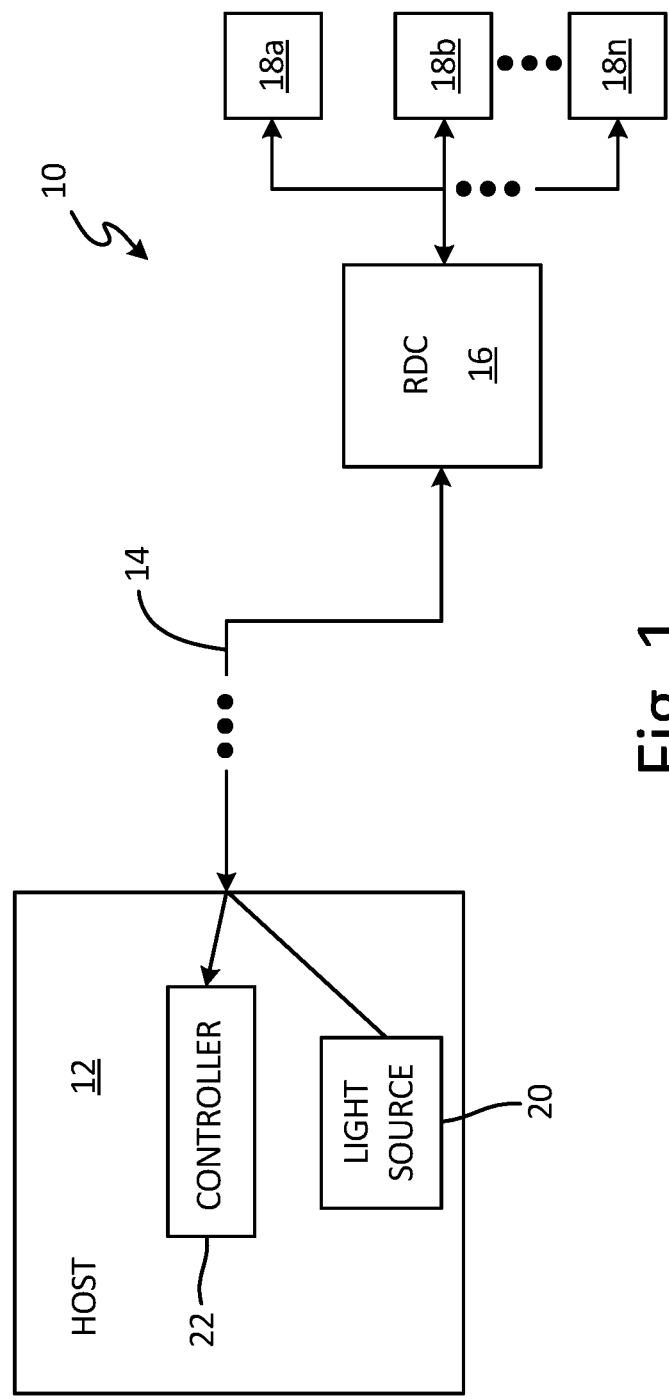
FIG. 1 is a block diagram illustrating a remote sensing system that includes an optical remote data concentrator.

FIG. 1 is a block diagram illustrating optical remote sensing system 10. System 10 includes host 12, optical link 14, remote data concentrator 16, and remote sensors 18a-18n. Host 12 includes light source 20 and controller 22. Optical link 14 is a link that allows data and power to be transmitted optically and may be configured as one or more optical fiber cables, for example. Optical fiber cables allow data and power to be transmitted optically over very long distances with low loss and with no generation of and/or effects from electromagnetic interference (EMI). An arrangement that transmits all power and data over fiber optic cable can be constructed such that it generates almost no EMI signature while providing maximum flexibility with respect to sensor type and placement. Remote data concentrator 16 can be placed tens of kilometers from host 12 and sensors 18a-18n can be dispersed tens of kilometers beyond remote data concentrator 16 with only minor losses in power transmission. System 10 is any system in which remote sensing is desirable such as, for example, a fuel tank farm or a remote military application. Remote sensors 18a-18n are any sensors capable of obtaining data regarding an environment such as, for example, capacitive probes, temperature sensors, pressure sensors, or any other type of sensor.

Host 12 may be configured to provide power to, and receive data from, remote data concentrator 16. While illustrated as a single remote data concentrator 16, host 12 may provide power to, and receive data from, multiple remote data concentrators 16 over one or more optical links 14. Remote data concentrator 16 receives power from optical data link 14, conditions the power, and provides the power to remote sensors 18a-18n. Power may be provided to optical data link 14 using light source 20 which may be a laser, for example, or other light source. The light is transmitted over optical data link 14 to remote data concentrator 16 and received by remote data concentrator 16. Remote data concentrator 16 receives the light transmission from host 12 and converts the optical energy into electrical energy. The electrical energy may be stored and utilized to power both remote data concentrator 16 as well as remote sensors 18a-18n.

Host 12 receives data from remote data concentrator 16 over optical link 14. This data may be obtained from remote sensors 18a-18n through remote data concentrator 16. In an embodiment, the data may be transmitted over the same optical fiber cable as the power from host 12. For example, the optical power signal may be transmitted at a first optical wavelength, while the optical data signals may be transmitted at a second optical wavelength, allowing both power and data to be optically transmitted over the same optical fiber cable. Alternatively, power and data may be transmitted over the same optical fiber cable by multiplexing the signals in time. For example, power can be turned off for a brief period, during which time data may be transmitted from sensors 18a-18n and/or from remote data concentrator 16.

Figure 2:
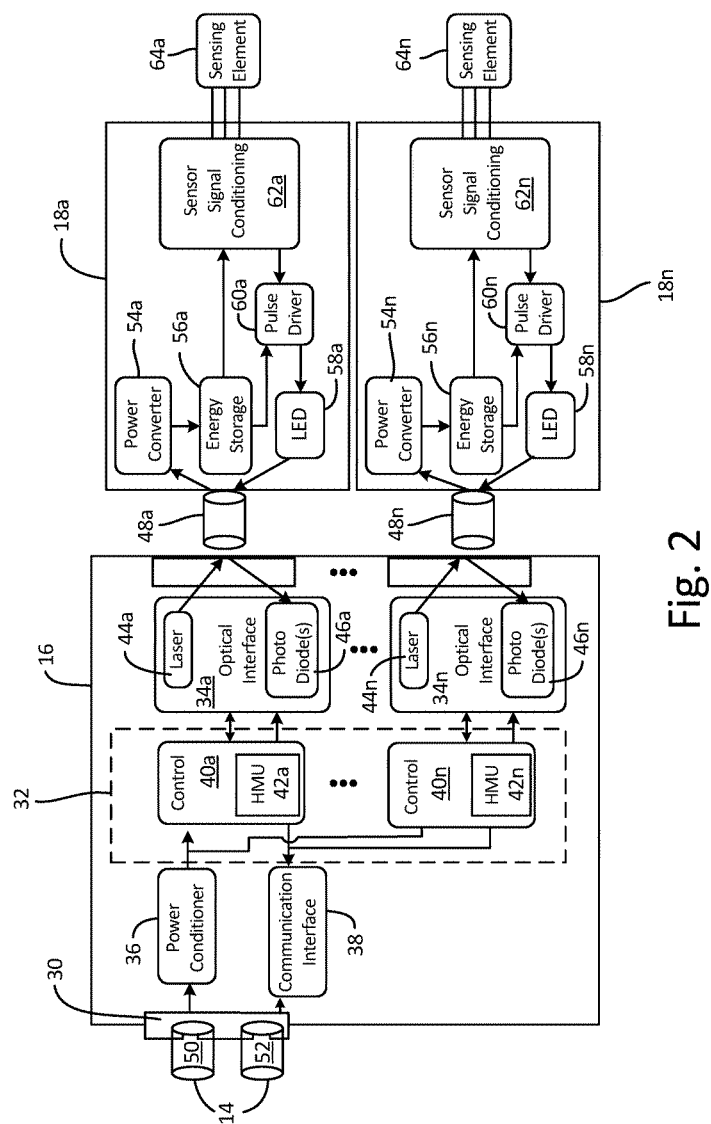
FIG. 2 is a block diagram illustrating an optically interfaced remote data concentrator.

FIG. 2 is a block diagram illustrating remote data concentrator 16 and remote sensors 18a-18n. Remote data concentrator 16 includes optical interface 30, control circuit 32, and sensor interfaces 34a-34n. Optical interface 30 includes power conditioner 36 and communication interface 38. Control circuit 32 includes controllers 40a-40n, each including respective power and health management units 42a-42n. Sensor interfaces 34a-34n each include respective light sources 44a-44n and photodiodes 46a-46n.

Sensor interfaces 34a-34n are coupled to remote sensors 18a-18n through optical fiber cables 48a-48n. Remote data concentrator 16 may be coupled to host 12 through optical fiber cables 50 and 52. Optical power may be received on optical fiber 50 and optical data may be communicated on optical fiber 52. While illustrated as two optical fibers 50 and 52, power may be received, and data may be transmitted, on a single optical fiber cable. Controllers 40a-40n are any digital or analog electronic circuits capable of providing power and data processing and transmission. While illustrated as optical fiber cables 48a-48n, remote data concentrator 16 may be coupled to remote sensors 18a-18n through any type of optical or electrical link.

Each remote sensor 18a-18n communicates with remote data sensor 16 over respective optical fiber cables 48a-48n. Remote sensors 18a-18n include respective power converters 54a-54n, energy storage devices 56a-56n, light sources 58a-58n, pulse drivers 60a-60n, sensor signal conditioning circuits 62a-62n and sensing elements 64a-64n. Remote sensors 18a-18n may be any sensing devices that are capable of generating data based upon physical properties of the environment, such as fuel sensors, vibration sensors, pressure sensors, or any other type of sensor.

Optical energy is received from host 12 through optical fiber 50. For example, host 12 may utilize a laser or other light source to transmit light to remote data concentrator 16. Optical power conditioner 36 receives the light transmitted from host 12 and converts the optical energy into electrical energy. Optical power conditioner 36 may include semiconductor devices capable of producing an electrical output based upon an optical input such as photodiodes and/or phototransistors, for example. Optical power conditioner 36 may also include electrical circuits capable of conditioning the electrical output from the semiconductor devices. For example, boost or buck circuits may be included to increase or decrease the power output of optical power conditioner 36 to control circuit 32.

Control circuit 32 may be configured to store power and provide power as desired to remote sensors 18a-18n. For example, each power and health management unit 42a-42n may include a storage device such as a capacitor or a battery to store electrical energy from optical power conditioner 36. This stored energy may be utilized to provide power as desired to respective remote sensor 18a-18n. Power may be provided to respective remote sensors 18a-18n continuously, or periodically based on the needs of the respective remote sensor 18a-18n. When it is desirable to provide power to a respective remote sensor 18a-18n, respective power and health management unit 42a-42n controls respective light source 44a-44n. Light source 44a-44n may be any light source capable of providing optical energy to a respective remote sensor 18a-18n such as a laser, for example.

Remote sensors 18a-18n receive optical energy from remote data concentrator 16 over respective optical fiber cables 48a-48n. Power converters 54a-54n convert the optical energy into an electrical output using semiconductor devices, for example, capable of producing electrical output from an optical input such as photodiodes. Storage devices 56a-56n may be any electrical storage device such as a capacitor or battery, and may be configured to store electric energy from respective power converters 54a-54n. Sensor signal and conditioning units 62a-62n may be any digital or analog electronic circuits capable of providing excitation to, and receiving analog or digital sensed data from, sensing elements 64a-64n.

Sensor signal and conditioning units 62a-62n may be configured to receive the sensed data and condition it for transmission on respective optical fiber cables 48a-48n. This may include converting the sensed data into digital data and providing the digital data to pulse drivers 60a-60n. For example, the sensed data may be converted into serial data and provided to pulse drivers 60a-60n one data bit at a time. Pulse drivers 60a-60n may be configured to drive light sources 58a-58n which may be, for example, light-emitting diodes (LEDs). LEDs 58a-58n provide the sensed data as optical data to optical fiber cables 48a-48n.

Optical interfaces 34a-34n may be configured to receive the optical sensed data from optical fibers 48a-48n using photodiodes 46a-46n. While illustrated as photodiodes 46a-46n, optical interfaces 34a-34n may utilize any other device capable of receiving optical data and converting the optical data into electrical signals. Optical interfaces 34a-34n provide the electrical signals to control circuit 32. Each respective controller 40a-40n may receive the electrical signals and condition the electrical signals for output on optical link 14. For example, controllers 40a-40n may convert the electrical signals into digital serial data for transmission one bit at a time. The digital serial data may be provided to communication interface 38 which may include a light source such as an LED or a laser, for example. The light source may be operated to provide optical data onto optical link 14. This way, the sensed data from remote sensors 18a-18n may be optically transmitted from remote data concentrator 16 to host 12 (as shown in FIG. 1).

By utilizing optical interfaces 30 and 34a-34n, electrical interfaces between data concentrators and remote hosts, as well as between the data concentrator and remote sensors, may be eliminated. Electrical interfaces are subject to fault conditions such as electrical arcing, for example. Removing the threat of electrical faults is advantageous in volatile environments such as, for example, fuel tank farms. Further, electrical interfaces generate electromagnetic interference (EMI). The EMI generated may be unique for given applications. This is undesirable in scenarios such as military applications in which it is desirable for the remote sensing systems to go undetected. By utilizing optical interfaces for remote data concentrators, the generation of EMI may be eliminated.

DISCUSSION OF POSSIBLE EMBODIMENTS

The following are non-exclusive descriptions of possible embodiments of the present invention.

A remote data concentrator includes a front end interface, a plurality of back end interfaces and a control circuit. The front end interface is configured to receive optical energy as input and provide optical data as output to an optical link. The plurality of back end interfaces are configured to connect to a plurality of sensors. Each of the plurality of back end interfaces are configured to provide sensor power to the plurality of sensors and receive sensor data from the plurality of sensors. The control circuit is configured to provide power from the front end interface to the plurality of back end interfaces and to provide the sensor data from the plurality of back end interfaces to the front end interface.

The remote data concentrator of the preceding paragraph can optionally include, additionally and/or alternatively, any one or more of the following features, configurations, operations, and/or additional components:

A further embodiment of the foregoing remote data concentrator, wherein the plurality of back end interfaces are optical interfaces configured to provide the sensor power as optical energy and receive the sensor data as optical data.

A further embodiment of any of the foregoing remote data concentrators, wherein the front end interface includes a power converter configured to convert the optical energy from the optical link into electrical energy and provide the electrical energy to the control circuit.

A further embodiment of any of the foregoing remote data concentrators, wherein the control circuit comprises a plurality of controllers configured to each connect to a respective one of the plurality of back end interfaces, and wherein each of the plurality of controllers includes a power unit configured to store the electrical energy from the front end interface and provide stored electrical energy to the plurality of back end interfaces.

A further embodiment of any of the foregoing remote data concentrators, wherein each of the plurality of back end interfaces include an optical converter device configured to convert the sensor data from sensor optical data into sensor electrical data.

A further embodiment of any of the foregoing remote data concentrators, wherein the control circuit provides the sensor electrical data to the front end interface, and wherein the front end interface includes a light source configured to convert the sensor electrical data into the link optical data.

A further embodiment of any of the foregoing remote data concentrators, wherein the optical link is a single optical fiber cable.

A method for interfacing an optical link with one or more sensors includes conditioning power, using a remote data concentrator, obtained optically from the optical link; providing, using the remote data concentrator, the power to the one or more sensors using one or more back end interfaces; receiving, using the one or more back end interfaces, sensed data from the one or more remote sensors; and outputting the sensed data optically, using the remote data concentrator, to the optical link.

The method of the preceding paragraph can optionally include, additionally and/or alternatively, any one or more of the following features, configurations, operations, and/or additional components:

A further embodiment of the foregoing method, wherein providing, using the remote data concentrator, the power to the one or more sensors comprises providing the power as sensor optical energy to the one or more sensors.

A further embodiment of any of the foregoing methods, wherein receiving, using the one or more back end interfaces, the sensed data includes receiving the sensed data as optical sensed data; and converting the optical sensed data into electrical sensed data.

A further embodiment of any of the foregoing methods, wherein conditioning power, using the remote data concentrator includes receiving, using a front end interface of the remote data concentrator, link optical energy from the optical link; and converting, using the front end interface, the link optical energy into electrical energy.

A further embodiment of any of the foregoing methods, wherein providing, using the remote data concentrator, the power to the one or more sensors using the one or more back end interfaces includes storing, by a control circuit of the remote data concentrator, the electrical energy; providing stored electrical energy from the control circuit to the back end interfaces; and converting, by the one or more back end interfaces, the stored electrical energy into the sensor optical energy.

A further embodiment of any of the foregoing methods, wherein outputting the sensed data optically, using the remote data concentrator, to the optical link includes providing, by the control circuit, the electrical sensed data to the front end interface; and converting, using a light source, the electrical sensed data into optical link data.

A remote sensing system includes an optical link, a plurality of remote sensors and a data concentrator. The plurality of remote sensors are configured to obtain sensed data. The data concentrator includes first and second interfaces. The first interface is configured to receive power from the optical link. The second interface is configured to provide the power to the plurality of remote sensors and receive the sensed data from the plurality of remote sensors. The first interface is further configured to provide the sensed data optically to the optical link.

The remote sensing system of the preceding paragraph can optionally include, additionally and/or alternatively, any one or more of the following features, configurations, operations, and/or additional components:

A further embodiment of the foregoing system, wherein the optical link is a single optical fiber cable.

A further embodiment of any of the foregoing systems, wherein the second interface is an optical interface configured to provide the sensor power as sensor optical energy and receive the sensed data as sensor optical data.

A further embodiment of any of the foregoing systems, wherein the first interface includes a power converter configured to convert link optical energy from the optical link into electrical energy and provide the electrical energy to a control circuit.

A further embodiment of any of the foregoing systems, wherein the control circuit includes at least one power unit configured to store the electrical energy from the first interface and provide stored electrical energy to the second interface.

A further embodiment of any of the foregoing systems, wherein the second interface includes at least one photodiode configured to convert the sensor optical data into electrical data.

A further embodiment of any of the foregoing systems, wherein the control circuit is configured to provide the electrical data to the front end interface, and wherein the front end interface includes a light source configured to convert the electrical data into link optical data for transmission on the optical link.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A remote data concentrator comprising:
a front end interface configured to receive optical energy as input and provide link optical data as output to an optical link;
a plurality of back end optical interfaces configured to connect to a plurality of sensors, wherein each of the plurality of back end optical interfaces are configured to provide sensor power as optical power to the plurality of sensors and receive sensor data as optical data from the plurality of sensors; and
a control circuit configured to provide power from the front end interface to the plurality of back end optical interfaces and to provide the sensor data from the plurality of back end optical interfaces to the front end interface;
wherein the front end interface includes a power converter configured to convert the optical energy from the optical link into electrical energy and provide the electrical energy to the control circuit; and
wherein the control circuit comprises a plurality of controllers configured to each connect to a respective one of the plurality of back end optical interfaces, and wherein each of the plurality of controllers includes a power unit configured to store the electrical energy from the front end interface and provide stored electrical energy to the plurality of back end optical interfaces.

2. The remote data concentrator of claim 1, wherein each of the plurality of back end interfaces include an optical converter device configured to convert the sensor data from sensor optical data into sensor electrical data.

3. The remote data concentrator of claim 2, wherein the control circuit provides the sensor electrical data to the front end interface, and wherein the front end interface includes a light source configured to convert the sensor electrical data into the link optical data.

4. The remote data concentrator of claim 1, wherein the optical link is a single optical fiber cable.

5. A method for interfacing an optical link with one or more sensors, the method comprising:
receiving, using a front end interface of a remote data concentrator, link optical energy from the optical link;
converting, using the front end interface, the link optical energy into electrical energy;
storing, by a control circuit of the remote data concentrator, the electrical energy, wherein the control circuit includes a plurality of controllers configured to each connect to a respective one of a plurality of back end interfaces;
providing stored electrical energy from each of the plurality of controllers to each of the respective ones of the plurality of back end interfaces;
providing, using the remote data concentrator, the power to the one or more sensors using the plurality of back end interfaces;
receiving, using the plurality of back end interfaces, sensed data from the one or more sensors; and
outputting the sensed data optically, using the remote data concentrator, to the optical link.

6. The method of claim 5, wherein providing, using the remote data concentrator, the power to the one or more sensors comprises providing the power as sensor optical energy to the one or more sensors.

7. The method of claim 6, wherein receiving, using the plurality of back end interfaces, the sensed data comprises:
receiving the sensed data as optical sensed data; and
converting the optical sensed data into electrical sensed data.

8. The method of claim 5, wherein outputting the sensed data optically, using the remote data concentrator, to the optical link comprises:
providing, by the control circuit, the electrical sensed data to the front end interface; and
converting, using a light source, the electrical sensed data into optical link data.

9. A remote sensing system comprising:
an optical link;
a plurality of remote sensors configured to obtain sensed data; and
a data concentrator comprising:
a first interface configured to receive power from the optical link;
a plurality of controllers configured to store the power received from the optical link;
a second interface configured to provide the power to the plurality of remote sensors and receive the sensed data from the plurality of remote sensors, wherein the second interface includes a plurality of back end interfaces that each receive the power from a respective one of the plurality of controllers;
wherein the first interface is further configured to provide the sensed data optically to the optical link.

10. The remote sensing system of claim 9, wherein the optical link is a single optical fiber cable.

11. The remote sensing system of claim 9, wherein the second interface is an optical interface configured to provide the sensor power as sensor optical energy and receive the sensed data as sensor optical data.

12. The remote sensing system of claim 9, wherein the second interface includes at least one photodiode configured to convert the sensor optical data into electrical data.

13. The remote sensing system of claim 12, wherein the plurality of controllers are configured to provide the electrical data to the front end interface, and wherein the front end interface includes a light source configured to convert the electrical data into link optical data for transmission on the optical link.

* * * * *